United States Patent
Miller et al.

(10) Patent No.: US 8,594,684 B2
(45) Date of Patent: Nov. 26, 2013

(54) METHOD FOR BEARER ESTABLISHMENT IN A RADIO ACCESS NETWORK

(75) Inventors: Trent J. Miller, West Chicago, IL (US);
Rod N. Averbuch, Chicago, IL (US);
James A. Marocchi, Winfield, IL (US);
James E. Mathis, Barrington, IL (US);
Deborah J. Monks, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 601 days.

(21) Appl. No.: 12/642,238

(22) Filed: Dec. 18, 2009

(65) Prior Publication Data

US 2011/0151826 A1    Jun. 23, 2011

(51) Int. Cl.
*H04W 72/00*    (2009.01)

(52) U.S. Cl.
USPC ..... 455/450; 455/452.1; 455/455; 455/456.1; 455/434

(58) Field of Classification Search
USPC .............. 455/432.1, 434, 436, 440, 442, 445, 455/450, 456.1, 456.6; 370/312, 328, 329
See application file for complete search history.

(56) References Cited

U.S. PATENT DOCUMENTS

| | | | |
|---|---|---|---|
| 5,276,677 A | 1/1994 | Ramamurthy et al. | |
| 5,572,221 A | 11/1996 | Marlevi | |
| 5,719,854 A | 2/1998 | Chowdhury et al. | |
| 5,825,759 A | 10/1998 | Liu | |
| 6,119,007 A | 9/2000 | Chater-Lea | |
| 6,385,454 B1 | 5/2002 | Bahl | |
| 6,606,553 B2 | 8/2003 | Zobell et al. | |
| 6,609,002 B1 | 8/2003 | Krishnamurthy et al. | |
| 6,807,165 B2 | 10/2004 | Belcea | |
| 6,957,074 B2 | 10/2005 | Wang | |
| 7,286,474 B2 | 10/2007 | Garg et al. | |
| 7,330,480 B2 | 2/2008 | Khan et al. | |
| 2002/0028690 A1* | 3/2002 | McKenna et al. | 455/517 |
| 2003/0224799 A1 | 12/2003 | Squibbs | |
| 2004/0043772 A1 | 3/2004 | Quirke | |
| 2004/0198426 A1 | 10/2004 | Squibbs | |
| 2004/0228304 A1 | 11/2004 | Riedel | |

(Continued)

FOREIGN PATENT DOCUMENTS

| | | | |
|---|---|---|---|
| EP | 1532831 B1 | 10/2006 | |
| EP | 1397934 B1 | 7/2008 | |
| WO | 2009026088 A2 | 2/2009 | |

OTHER PUBLICATIONS

PCT International Search Report Dated Mar. 22, 2011.

(Continued)

*Primary Examiner* — Kathy Wang-Hurst
(74) *Attorney, Agent, or Firm* — Steven A. May (57) ABSTRACT

Generally speaking, pursuant to the various embodiments, pre-allocation of resources in a RAN of a communication system is performed. A system element having an application function determines, for a set of user equipment (UE), pre-allocation information used to select a set of cells in the RAN to which the set of UE will connect for exchanging data. The element sends a request to establish a bearer to an evolved packet core (EPC), wherein the request includes the pre-allocation information. The determining and sending actions are performed prior to one or more of the UE in the set of UE connecting to the set of cells. The EPC processes the request and returns a response to the system element, which identifies that a bearer for unicast and/or group communications has been established.

18 Claims, 4 Drawing Sheets

(56) References Cited

U.S. PATENT DOCUMENTS

| | | | |
|---|---|---|---|
| 2006/0099952 A1 | 5/2006 | Prehofer | |
| 2007/0202908 A1 | 8/2007 | Shaffer | |
| 2008/0205348 A1 | 8/2008 | Malladi | |
| 2009/0190471 A1 | 7/2009 | Mahendran | |
| 2011/0053590 A1* | 3/2011 | Belling et al. | 455/435.1 |
| 2011/0237258 A1* | 9/2011 | Nylander et al. | 455/437 |

OTHER PUBLICATIONS

Chan, et al. Integrating Mobility Prediction and Resource Pre-Allocation Into a Home-Proxy Based Wireless Internet Framework; IEEE ICON 2000, pp. 18-23, Singapore, Sep. 2000; ISBN: 0-7695-0777-8.

3GPP: "3GPP TS 23.203 V9.2.0 Technical Specification 3rd Generation Partnership Project: Technical Specification Group Services and System Aspects: Policy and Charging Control Architecture (Release 9)", vol. 23.203, No. V9.2.0; Sep. 1, 2009; pp. 1-120; XP002593599; Retrieved From Internet: URL:ftp://ftp.3.gpp.org/specs/archive/23_series/23.203/>; figure 5.1.1.

"Universal Mobile Telecommunications System (UMTS); LTE: Policy and Charging Control over RX Reference Point, (3GPP TS 29.214 Version 8.5.0 Release 8)"; Technical Specification, European Telecommunications Standards Institute (ETSI); France; No. V8.5.0; June 1, 2009; XP014044668; Paragraphs 5.6.1, 5.6.2.

"Universal Mobile Telecommunications System (UMTS); LTE: Policy and Charging Control over GX Reference Point, (3GPP TS 29.212 Version 7.9.0 Release 7)"; Technical Specification, European Telecommunications Standards Institute (ETSI); France; No. V7.9.0; Jun. 1, 2009; XP014044664; Paragraphs 5.6.4, 5.6.5.

Roland Zander, et al. "A Zone-Based Bandwidth Reservation Scheme for UMTS" 2004 IEEE; pp. 1993-1998.

\* cited by examiner

METHOD FOR BEARER ESTABLISHMENT IN A RADIO ACCESS NETWORK

TECHNICAL FIELD

The technical field relates generally to communication systems and more particularly to pre-allocating, for a set of user equipment, a bearer in a set of cells in a radio access network.

BACKGROUND

Long Term Evolution (LTE) is the last step toward the $4^{th}$ generation (4G) of radio technologies designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and published by $3^{rd}$ Generation Partnership Project (3GPP), with the most recent version of the 3GPP TSs being published in September 2009 as "Release 9" (with Release 10 currently being developed).

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM, cdmaOne, W-CDMA (UMTS), and CDMA2000.

Most major carriers in the United States (US) and several worldwide carriers have announced plans to convert their networks to LTE beginning in 2009. In addition, public safety agencies (and US Intelligence Services) in the US have endorsed LTE as the preferred technology for the new 700 MHz public safety radio band. However, due to budget constraints, sharing of LTE networks is anticipated; even sharing of these networks by public safety agencies. Thus, as the number of users for particular LTE networks increases, this may present a problem of "communication resource" (i.e., bearer) allocation for user equipment (UE) for emergency responders that arrive at an incident (e.g., emergency) scene. This is because, at present, LTE only supports resource allocation based on the UE's IP address, which is translated by the LTE system to the UE's current cell of a radio access network (RAN). Thus, LTE currently only supports requests for a bearer at a cell that is currently serving the UE and to which the UE is currently connected. LTE does not currently provide for pre-allocation of cell resources before the UE connects to the cell.

There are some known "just-in-time" resource setup mechanisms that attempt to expedite the resource allocation process. However, since these mechanisms can only be used when the UE is in the cell, if the cell is busy, these mechanisms may fail or suffer significant delay. Thus, the so called "just-in-time" mechanisms do not provide the reliability needed in mission critical scenarios, wherein delays in communications between responders are unacceptable.

Thus, there exists a need for pre-allocating, for a set of user equipment, a bearer within a set of cells in a radio access network, wherein the bearer is established prior to at least one user equipment in the set of user equipment connecting to the cells.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, pre-allocation of bearer resources in a RAN of a communication system is performed. As the term is used herein, a "bearer" is an over-the-air, wireless transmission path in a network (such as a RAN) and is used to carry UE data traffic (also termed service data flows or SDFs). A bearer can be a "dedicated bearer" or a "default bearer". A "default bearer", as used herein, is a non-GBR (guaranteed bit rate) bearer that provides for "best effort" SDF transmission and is granted to a UE for the duration of its connection to a Packet Data Network (PDN) and need not be explicitly requested. A "dedicated bearer", as used herein, is any additional bearer that is established for the same UE and is specifically requested by (or on behalf of) a UE. Moreover, a bearer can be allocated for "unicast communications" to a single UE at a unique destination address or for "group communications" to multiple UE at a shared address. A bearer for unicast communications is termed a "unicast bearer"; and a bearer for group communications can be a "multicast bearer" for multicast communications, a "broadcast bearer" for broadcast communications, and the like.

In accordance with an embodiment, a system element having an application function determines, for a set (wherein "set" as used herein means one or more) of user equipment (UE), pre-allocation information used to select a set of cells in the RAN to which the set of UE will connect for exchanging data. The system element sends a request to establish a bearer to an evolved packet core (EPC), wherein the request includes the pre-allocation information. The determining and sending actions are performed prior to one or more of the UE in the set of UE connecting to the set of cells. The EPC processes the request and returns a response to the system element, which identifies that a bearer for unicast and/or group communications has been established.

The bulk of call setup time is RAN resource allocation; and the disclosed teachings are beneficial in that they allow resources to be pre-allocated and available for responders arriving at an incident scene to enable near instantaneous call set up. Thus, the teachings herein better address mission critical scenarios by enabling the reservation of resources in the RAN while the expected users of the resources are en route to particular locations, thereby enabling the resources to be available with a high degree of certainty when those users arrive at the locations. Those skilled in the art will realize that the above recognized advantages and other advantages described herein are merely illustrative and are not meant to be a complete rendering of all of the advantages of the various embodiments. Moreover, although the described embodiments pre-allocate bearers for first responders to an incident (such as police, fire, and emergency medical services), the teachings herein are applicable to pre-allocate bearers for other users including, but not limited to, second responders (e.g., public works), critical infrastructure workers (e.g., utility company workers), enterprise customers who pay carriers for such "enhanced" services, etc.

Figure 1:
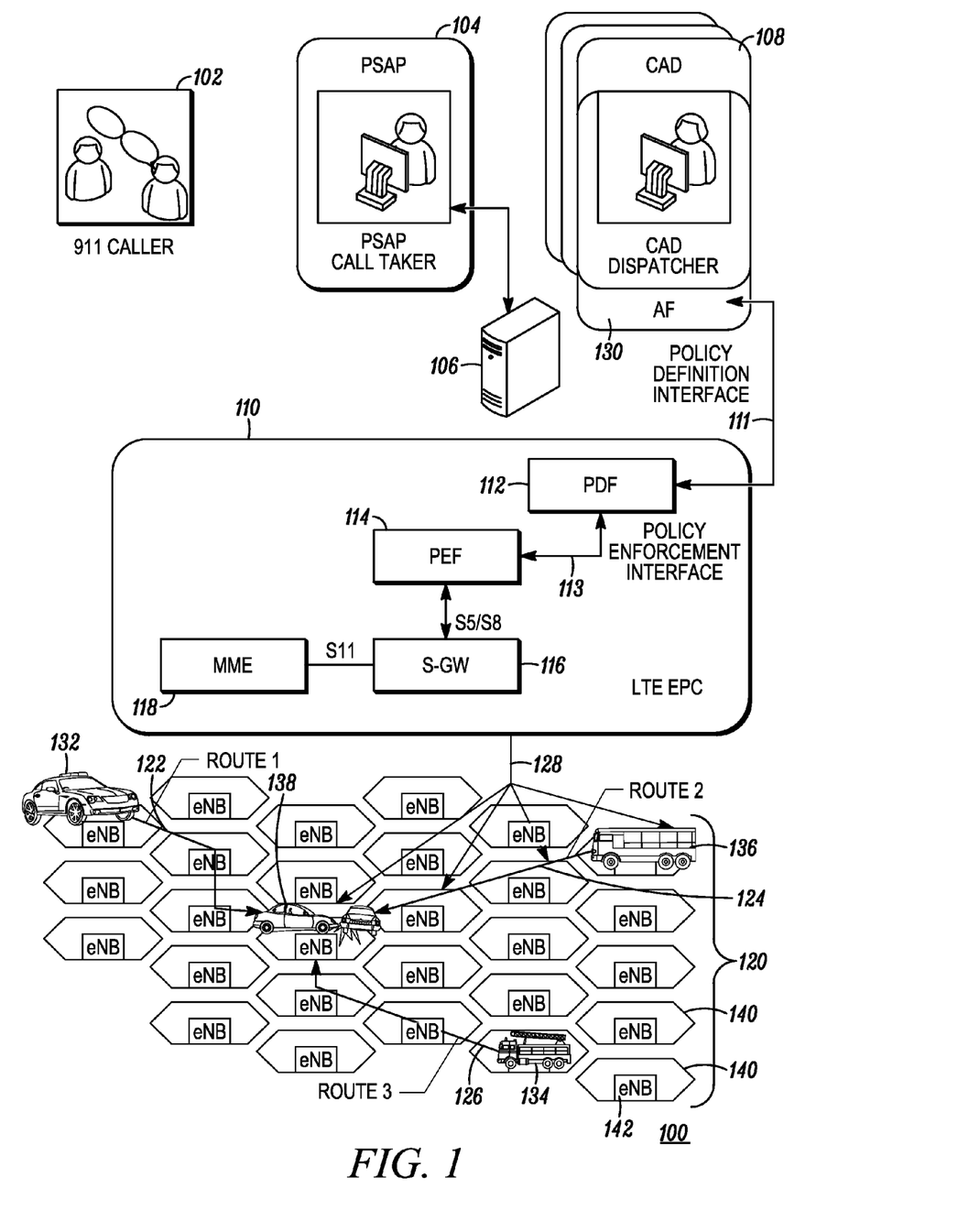
FIG. 1 is a diagram of a communication system that implements pre-allocation of radio access network resources for unicast communications in accordance with some embodiments.

Referring now to the drawings, and in particular FIG. 1, a LTE communication system in accordance with some embodiments is shown and indicated generally at 100. System 100 includes system elements of: 911 callers 102, user equipment (UE) 132, 134, and 136 of responders to an incident (in this case a vehicular accident 138); a public service answering point (PSAP) 104 coupled to a database 106; one or more computer aided dispatch (CAD) servers 108, an LTE evolved packet core (EPC) 110 having a number of logical elements described in more detail below, and a radio access network (RAN) 120 that includes a plurality of cells 140 each having an infrastructure device 142 (in this case an Evolved NodeB device, abbreviated as eNB or eNodeB).

In this illustrative embodiment, at least the responders' UE, the EPC logical elements, and the RAN eNodeBs implement protocols and signaling in accordance with the 3GPP TS for LTE (such as Release 9 or any other prior or future Release). Those skilled in the art, however, will recognize and appreciate that the specifics of this example are merely illustrative of some embodiments and that the teachings set forth herein are applicable in a variety of alternative settings. For example, since the teachings described do not depend on the particular standard being used, they can be applied to any type of system having an EPC used to reserve, for UE, resources in a connected RAN. As such, other alternative implementations are contemplated and are within the scope of the various teachings described. Moreover, only a limited number of system elements and one RAN are shown in the diagram, but more or fewer system elements and RANs may be included in a commercial embodiment.

In general, the UE, the PSAP 104, the CAD servers 108, the LTE EPC 110 logical elements, and the eNodeBs are each implemented using (although not shown) a memory, one or more network interfaces, and a processing device that are operatively coupled, and which when programmed form the means for these system elements to implement their desired functionality, for example as illustrated by reference to signaling diagrams 200 and 400 shown, respectively, in FIG. 2 and FIG. 4. The network interfaces are used for passing signaling (e.g., messages, packets, datagrams, frames, superframes, and the like) between the elements of the system 100. The implementation of the network interface in any particular element depends on the particular type of network, i.e., wired and/or wireless, to which the element is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

Figure 2:
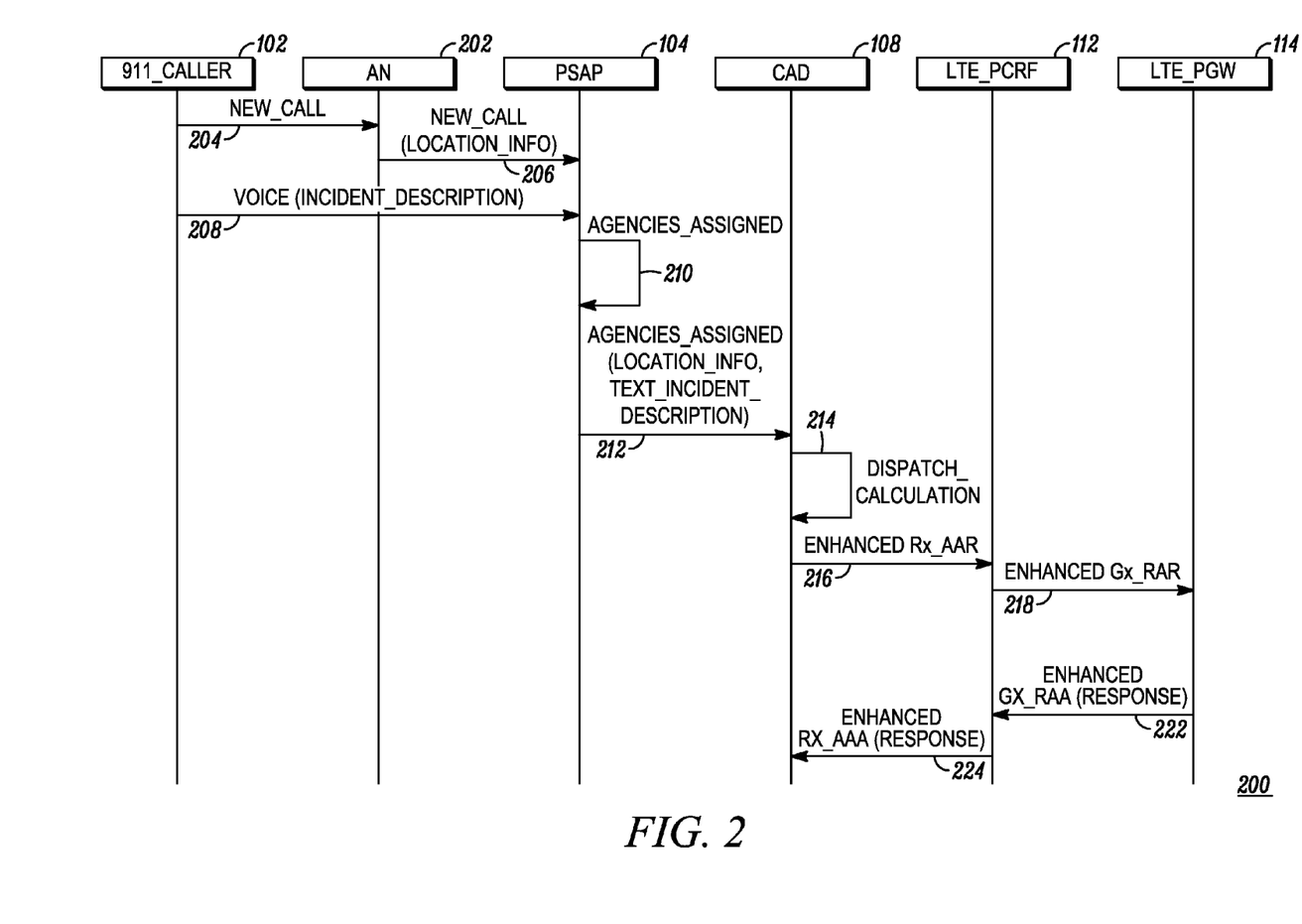
FIG. 2 is a signaling diagram illustrating pre-allocation of radio access network resources for unicast communications in accordance with some embodiments.
Figure 4:
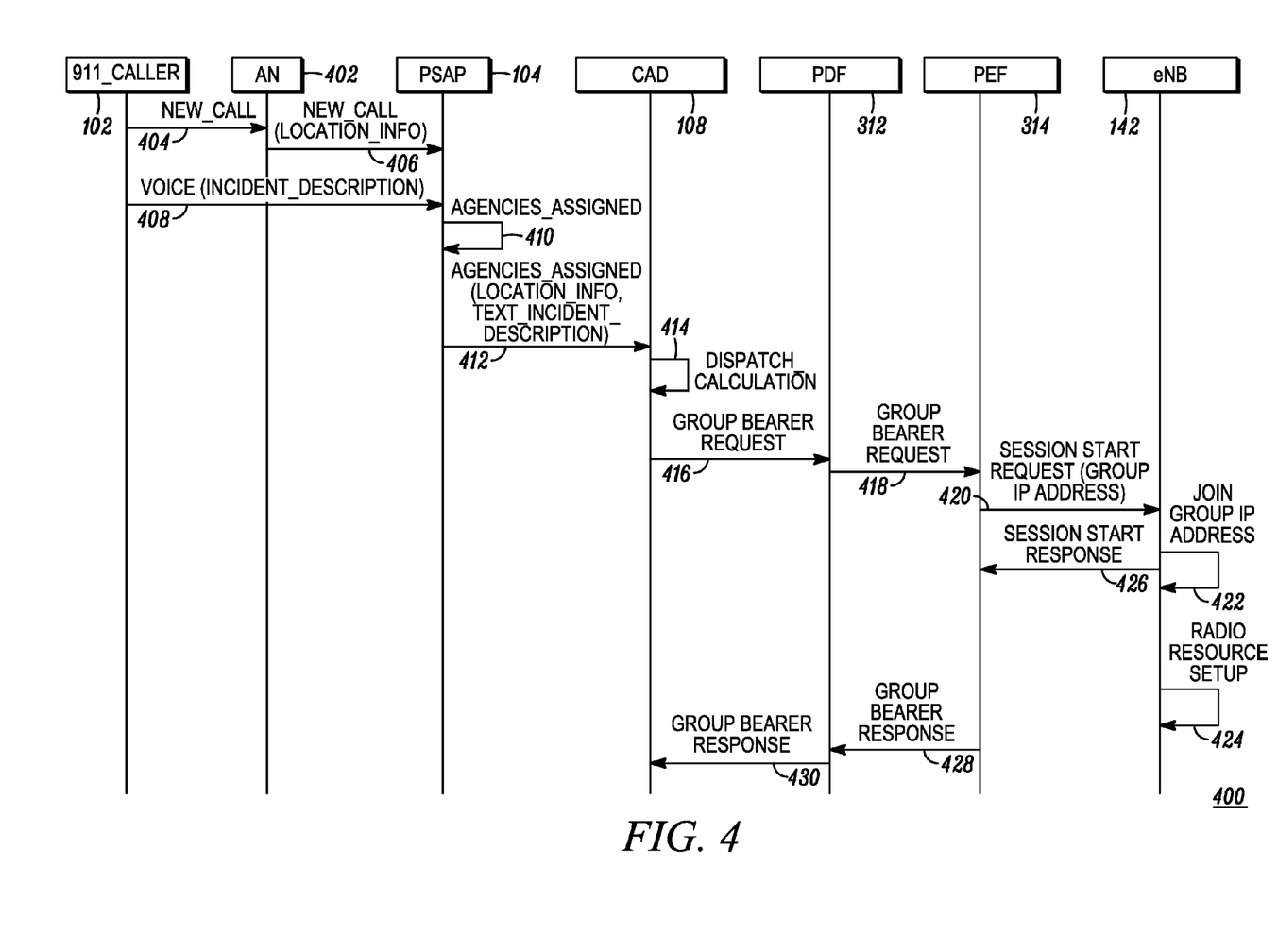
FIG. 4 is a signaling diagram illustrating pre-allocation of radio access network resources for group communications in accordance with some embodiments.

The processing device utilized by the UE, the PSAP 104, the CAD servers 108, the LTE EPC 110 logical elements, and the eNodeBs may be programmed with software or firmware logic or code for performing signaling such as that included in signaling diagrams illustrated in FIGS. 2 and 4; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the signaling illustrated in FIGS. 2 and 4. The UE 132, 134, 136, which are also referred to in the art as communication devices, access devices, access terminals, mobile stations, mobile subscriber units, mobile devices, user devices, and the like, can be any standard communication device such as radios, mobile phones, mobile data terminals, Personal Digital Assistants (PDAs), laptops, two-way radios, cell phones, and any other device capable of operating in a wired or wireless environment and that can be used, for example, by responders dispatched as a result of a 9-1-1 call. The PSAP 104 is a call center having a number of call takers that are responsible for answering calls to emergency telephone numbers for various public safety or emergency services such as police, firefighting, and EMS (emergency medical services); and can be associated with various features such as Enhanced 911 (or E-911), which automatically associates a physical address with the calling party's telephone number to route the call to the most appropriate PSAP, and/or Next Generation 911 (or NG9-1-1) aimed at updating the 9-1-1 infrastructure to enable the public to transmit text, images, video, and other data to the PSAP.

The PSAP 104 connects to a calling device of the 911 caller 102 over both wireless and wired networks depending on the type of calling device from which the 911 call is placed. The PSAP 104 further couples to the database 106, usually via a wired network, which can include, for example, an ANI/ALI database 106. The ANI/ALI database 106 is managed by a local carrier used to place the 911 call and is included in an infrastructure device (such as an access node (AN), a base station, a base transceiver station, and the like) that routes the 911 call to the PSAP 104. The ANI/ALI database 106 includes an ANI (Automatic Number Identification) feature used to automatically display, at the PSAP 104, the telephone number associated with the line that called 911. Each telephone number and the physical location to which it corresponds are stored in an ALI (Automatic Location Identification) database, managed by the local carrier. In a 911 call, the PSAP 104 uses the ANI to retrieve the caller's physical address from the ALI database.

The PSAP 104 is connected to the CAD servers 108 through a wired network, wherein each public safety agency responsive to 911 calls usually has a separate CAD server. Each CAD server 108 contains a suite of software packages used by personnel such as emergency communications dispatchers, call-takers, and 911 operators in centralized, public-safety call centers, field personnel utilizing mobile data terminals (MDTs) or mobile data computers (MDCs), and the like, to initiate public safety calls for service, to dispatch responding resources (e.g., responders sent to the emergency scene and their equipment), and to maintain the status of responding resources in the field.

More particularly, the CAD server 108 can either be used to send messages to the dispatchee via a MDT and/or used to store and retrieve data (e.g., radio logs, field interviews, client information, schedules, etc.). A dispatcher may announce the call details to field units over a two-way radio, and/or the CAD server 108 may send text messages to alphanumeric pagers or wireless telephony text services like Short Message Service (SMS). Notably, persons in the dispatch center are able to easily view and understand the status of all units being dispatched using the CAD server 108 because it provides displays and tools so that the dispatcher has an opportunity to handle calls-for-service as efficiently as possible.

Each CAD server 108 further includes an "application function" (AF) 130, which, as that term is generally used herein, is a logical element housed in a server side system element (e.g., the CAD server or other system elements not shown in system 100 including, but not limited to, an application server, media server, or other server that may have a need to pre-allocate communication resources for UE) or in a client side system element (e.g., the UE), which implements logic, in accordance with the teachings herein, to communicate with the EPC 110 to pre-allocate communication resources in one or more cells in the RAN 120, wherein these resources are reserved for one or more UE before the UE arrive at the cell. In this illustrative embodiment, the AF represents a logical element that supports applications (executed in a server side device or a client side device) that require dynamic policy and/or charging control such as is needed for Quality of Service (QoS) management.

As such, the UE 132, 134, and 136 also include an AF (on the client side) that communicates with the LTE EPC 110 (via the RAN 120) to reserve network resources in one or more cells in the RAN, which may also be configured to pre-allocate communication resources in accordance with the present teachings or to request that a server pre-allocate such resources. Moreover, in this illustrative implementation, the AF functionality in both the CAD server 108 and the UE implement protocols and some signaling as defined by 3GPP TS for LTE.

The LTE EPC 110, as referred to herein, is an all-IP core network that provides mobile core functionality that, in previous mobile generations (2G, 3G), has been realized through two separate sub-domains: circuit-switched (CS) for voice and packet-switched (PS) for data. The LTE EPC 110 enables the above-mentioned all IP end-to-end delivery of media: from mobile handsets and other user equipment with embedded IP capabilities, over IP-based Evolved NodeBs (LTE base stations), across the EPC and throughout the application domain (IMS (IP Multimedia Subsystem) and non-IMS.

The LTE EPC 110, which in this illustrative embodiment facilitates unicast communications, comprises the logical components of a Policy Definition Function (PDF) 112, a Policy Enforcement Function (PEF) 114, a Serving Gateway (S-GW) 116, and a Mobility Management Entity (MME) 118. These logical entities are shown as separate logical blocks and indeed can, in some embodiments, each be included in separate hardware devices or can, alternatively, be combined in one or more hardware devices. Also, the LTE EPC 110, depending on the size of the network, may have several such components serving thousands or tens of thousands of UE and CAD servers. Moreover, in one embodiment the LTE EPC 110 operates alongside an LTE EPC that facilitates group communications, such as LTE EPC 310 described below with reference to FIG. 3.

Turning first to the PDF 112, as the term is used herein, a policy definition function is a logical element that provides for, identifies, stores, or otherwise obtains operator-defined rules for resource allocation and usage. The PDF 112 is coupled to a system element (in this case the CAD 108 and, in particular, to the AF of the CAD 108) via a policy definition interface 111. The functionality of the PDF can be placed in any suitable logical element of the EPC (for both the unicast and group communication embodiments). However, in this illustrative 3GPP embodiment, the functionality of the PDF 112 is performed by a Policy and Charging Rules Function (PCRF), and the policy definition interface 111 comprises an "enhanced" Rx interface that serves as a transmission path through a wired network for communicating Rx messages. The Rx interface is referred to as "enhanced" because it enables the sending of novel signaling in accordance with the teachings herein. The Rx messages sent over the Rx interface are called Rx AAR messages (from the AF to the PCRF) and Rx AAA messages (from the PCRF to the AF). Therefore, later in describing a signaling diagram 200 associated with an embodiment for pre-allocating a unicast bearer, the PDF 112 is referred to as the LTE PCRF 112, and the messages communicated over the enhanced Rx interface are referred to as Rx AAR and Rx AAA messages.

The PDF 112 is further coupled to a Packet Enforcement Function (PEF) 114 via a policy enforcement interface 113. As the term is used herein, a policy enforcement function is a logical element that applies or enforces the operator-defined rules for resource allocation and usage. The functionality of the PEF can be placed in any suitable logical element of the EPC (for both the unicast and group communication embodiments). However, in this illustrative 3GPP embodiment, the functionality of the PEF 114 is performed by a packet data network gateway PDN-GW (and more particularly by a Policy and Charging Enforcement Function (PCEF) in the PDN-GW), and the policy enforcement interface 113 comprises an "enhanced" Gx interface 113 that serves as a transmission path for communicating Gx messages. The Gx interface is referred to as "enhanced" because it enables the sending of novel signaling in accordance with the teachings herein. The Gx messages sent over the Gx interface are called Gx RAR messages (from the PCRF to the PCEF) and Gx RAA messages (from the PCEF to the PCRF). Therefore, later in describing the signaling diagram 200 associated with the embodiment for pre-allocating a unicast bearer, the messages communicated over the enhanced Gx interface are referred to as Gx RAR and Gx RAA messages.

The S-GW 116 is connected to the PEF (particularly the PDN-GW) 114 via interfaces and transmission paths S5 and S8, for example, as defined in the 3GPP TS for LTE. The S-GW 116 is a data plane element whose primary function is to manage user-plane mobility and act as a demarcation point between the RAN and core networks. The S-GW 116 maintains data paths between eNodeBs in the RAN and the PDN-GW. From a functional perspective, the S-GW 116 is the termination point of the packet data network interface towards the RAN. When a UE move across areas served by eNodeB elements in the RAN, the S-GW 116 serves as a local mobility anchor, which means that packets are routed through this point for intra RAN mobility and mobility with other 3GPP technologies, such as 2G/GSM and 3G/UMTS.

The MME 118 is connected to the S-GW 116 via an interface and transmission path S11, for example, as defined in the 3GPP TS for LTE. The MME 118 performs the signaling and control functions to manage the UE access to network connections, the assignment of network resources in the cells of the RAN, and the management of the mobility states to support tracking, paging, roaming and handovers, and the control of all control plane functions related to subscriber and session management. Accordingly, the MME 118 performs the bearer management control functions to establish the bearer paths 128 that are used by the UE. Additional known elements and interfaces in a LTC EPC as described in the 3GPP TS for LTE that are needed for a commercial embodiment of the LTE EPC 110 are not shown in FIG. 1 for ease of illustration.

RAN 120 in this embodiment is a E-UTRAN (Evolved UMTS Terrestrial Radio Access Network) comprising multiple cells 140 each having an ENodeB 142. Each cell represents a geographic coverage area that provides the wireless resources termed herein as "bearers" for carrying data (or SDFs) for UE connected to the RAN. A UE is deemed "connected" to the RAN when it has successfully authenticated with the EPC and attached to an eNodeB to access and use bearer resources and when the UE to MME signaling connection has been established. The ENodeB devices 142 serve as the intermediate infrastructure devices between the UE and the LTE EPC 110 and a point of access for the UE to allocated bearers.

A particular cell in the RAN can be identified by various cell identifiers. For example, a cell can be identified by an "infrastructure identifier", which as the term is used herein means an identifier of a radio network object (or infrastructure device, e.g., eNodeB) in the cell that can be broadcasted over the geographic area of the cell. A cell can also be identified by "sector identifiers", which are logical identifiers for multiple sectors or sub-areas within the cell that are served by the same eNodeB. Thus, the term "cell identifier" includes infrastructure identifiers, sector identifiers, and the like.

Turning now to FIG. 2, a signaling diagram illustrating messages exchanged between some system elements for pre-allocation of one or more unicast bearers for UE is shown and generally indicated at 200. The messaging (and related illustrated functionality) is by and between the calling devices of the 911 callers 102, an AN 202, the PSAP 104, the CAD server 108, the LTE PCRF element in 112, and the LTE PGW 114 (e.g., by the PCEF). The format of messages exchanged between the UE 102 of the 911 caller, the AN 202, the PSAP 104 and the CAD server 108 depend on the particular network and, where applicable, the air interface and modulation schemes implemented in the system elements or any internal interfaces within the devices. The format of messages exchanged between the CAD 108, the LTE PCRF 112 and the LTE PGW 114 are in accordance with 3GPP TS for LTE; however, the content of some of these messages is adapted for the teachings herein as described later in further detail.

In this illustrative example, the 911 callers 102 initiate a new call 204 to the PSAP 104 via the AN 202 to describe an incident (e.g., the vehicular accident 138) near their current geographic location. The PSAP 104 obtains location information 206 associated with the call, which can comprise, for example, address information of the caller that is obtained from the ANI/ALI database 106 at the AN 202; and the 911 callers provide a incident description 208 to a call taker at the PSAP 104 and may also provide location information for the incident such as an address, area descriptor, and the like. However the PSAP may obtain incident location information for the incident using any suitable means. Moreover, it should be noted that the incident may be reported in other ways such as by public safety personnel in the area of the incident, incident command staff via a CAD application, fusion centers, etc.

In an embodiment, the PSAP 104 call taker uses the incident description 208 and the location information 206 and determines 210 which agencies should be assigned to the call (in FIG. 1, police, fire, and EMS are assigned) and forwards 212 the location information, the incident description (e.g., via a text message), and an indicator of the agencies assigned to the respective CAD servers(s) 108 for police, fire, and EMS. Each respective CAD 108 determines an incident type (e.g., a vehicular collision), assigns responders for the incident, determines the UE used by the responders, and then performs a "dispatch calculation". The "dispatch calculation" includes: an application calculation; a SDF calculation; and determining (at least for the UE of one or more of the assigned responders) pre-allocation information used to select at least one cell in the RAN to which one or more of the UE will connect at some future time for exchanging data.

The application calculation includes: based on the incident type and responders, determining, for the responder UE, the applications needed to service the incident, such as Push-to-Talk (PTT), data, on-scene video, etc.; and determining the RAN priority for each application based on the incident, wherein any applications already in use by the responder UE are taken into account in the application calculation. The SDF calculation includes determining uplink and downlink unicast SDFs needed with their QoS characteristics (such as QCI (QoS class identifier), ARP (allocation and retention priority), GBR (guaranteed bit rate), MBR (maximum bit rate), etc.), based on the list of applications for the incident and those already in use by the UE.

The third parameter of the dispatch calculation can be performed in a number of ways, with the result being to determine pre-allocation information or data used by the EPC to select one or more cells and/or to select one or more cell sectors in the RAN to which one or more UE will connect at some future time for exchanging data. This pre-allocation information may include, but is not limited to, one or more of the following: a list (meaning one or more) of cell identifiers (e.g., infrastructure identifiers and/or sector identifiers), mapping coordinates, location coordinates (e.g., GPS coordinates, LTE LCS coordinates, etc.), area or location identification, or a route indication for the set of user equipment.

In one illustrative implementation, the CAD server 108 (e.g., in the AF 130) or some other element located inside or external to the CAD server and coupled to the AF 130 determines, for example based on the location information provided by the PSAP 104 and/or the 911 callers 102, a location of the incident to which the responders and their UE were dispatched (and at which at least some of the responders have not arrived, although some may already be located in one or more cells in the area). This location information can comprise mapping coordinates, location coordinates, and/or area or location identification. The CAD server 108 can provide this location information to the EPC or can translate that location information into RAN cell identifiers, which is provided to the EPC; wherein the EPC would, in response, provide a response that indicates that at least one bearer was established at a cell providing coverage at the location of the incident.

In another illustrative implementation, the CAD server 108 (e.g., in the AF 130) or some other element located inside or external to the CAD server and coupled to the AF 130 determines a route (e.g., Route 1 (122) by a police responder, Route 2 (124) by a EMS responder, Route 3 (126) by a fire responder) of each responder to the incident to which the responders and their UE were dispatched (and at which at least some of the responders have not arrived). The CAD server 108 can provide this route information (e.g., in the form of mapping coordinates, location coordinates, etc.) to the EPC or translate the routes into a list of cell identifiers (e.g., infrastructure identifiers, sector identifiers, etc.) along each responder's route to the incident scene (including the incident scene itself); wherein the EPC would, in response, provide a response that indicates that at least one bearer was established at a cell providing coverage along the route to the location of the incident.

Moreover, in accordance with this implementation, the CAD server 108 may further receive current UE location information from the RAN via the LTE EPC 110 to continuously update the responders' route information (and the corresponding cell/sector information) along the responder's way to the incident. Accordingly, the "route" pre-allocation information provided to the EPC can be updated as a responder is rerouted, for instance in response to local conditions (e.g., congestion, accidents, temporary blockage, etc.); and the "route" pre-allocation information may further indicate cells/sectors that are adjacent to cells/sectors along the actual route taken by the responder, for instance to provide for alternate routing coverage and uncertainty in radio frequency (RF) coverage.

The CAD 108 then provides on the Rx interface 111 to the LTE PCRF 112 (for the responder UE still en route to incident) a request 216 (in this case an "enhanced" or modified Rx AAR 3GPP LTE message) that includes the pre-allocation information, wherein the request is for a unicast bearer (e.g., a dedicated bearer to support QoS for certain SDFs and a default bearer) in the set of cells thus indicated by the pre-allocation information. The enhanced Rx AAR message 216 may include any such pre-allocation information that indicates the cells and/or sectors to which the UE will connect and need a bearer "pre-allocated" (meaning already established before the UE gets to the cell), including but not limited to, a list of cell identifiers, mapping coordinates, location coordinates, an area or location identification, or a route indication for the UE.

The Rx AAR message 216 is referred to as "enhanced" because it contains the novel inclusion of a request for a bearer at a cell to which a UE has not yet connected, and includes a request based on pre-allocation information associated with specific cells and sectors (and may in some instances even list the specific cells and sectors). This is different from the known art where bearer allocation is only for the cell in which a UE is currently located and is accomplished by the UE requesting bearer allocation for the UEs current cell in a Rx AAR message to the LTE EPC on the Rx interface.

Upon receiving the enhanced Rx AAR message 216, the LTE EPC 110 processes the request for a unicast bearer, which results in the establishment of a bearer 220 in the cells indicated by the pre-allocation information in the Rx AAR message 216. The processing of the request for the unicast bearer includes the LTE PCRF 112 identifying relevant resource allocation and usage rules of the agency associated with the request and sending to the LTE PGW 114 an "enhanced" Gx RAR message 218 on the Gx interface 113 that includes the request for a unicast bearer and the associated resource allocation and usage rules. The Gx RAR message 218 is "enhanced" because (like the Rx AAR message 216) it contains the novel inclusion of a request for a bearer at a cell to which a UE has not yet connected and facilitates the assignment of a bearer in specific cells or sectors (and may in some instances even list the specific cells and sectors), which is different from the known art.

Also, like the Rx AAR message 216, the Gx RAR message 218 contains one or more of a list of cell identifiers, mapping coordinates, location coordinates, an area or location identification, or a route indication for the UE to indicate the set of cells to which the UE will connect for data transfer, which is also different from the known art. Accordingly, depending on the implementation, the system element could provide to the EPC direct pre-allocation information for selecting cells or sectors in the form of a list of cell identifiers (e.g., infrastructure identifiers, sector identifiers, etc.). Alternatively, the system element could provide the LTE PCRF with other pre-allocation information which the LTE PCRF passes to the LTE PGW for translation into a list of cell identifiers for establishing a unicast bearer; or the LTE PCRF can itself translate the pre-allocation information into the list of cell identifiers and provide this translation of the pre-allocation information to the LTE PGW.

Processing of the request for a unicast bearer after generating the enhanced Gx RAR message 218 includes known signaling between the MME and each relevant eNodeB (not shown) to establish the unicast bearer 220 in each cell indicated in the enhanced Gx RAR message 218. Moreover, any suitable technique may be used to map the pre-allocated bearers to the corresponding UE, e.g., using the UE's IP address. Information identifying the associated cells and/or sectors having a pre-allocated bearer responsive to the request and information identifying the pre-allocated bearers (e.g., channel, frequency allocation) is provided from the MME back to the LTE PGW 114. The LTE PGW 114 indicates in an "enhanced" Gx RAA response message 222 to the LTE PCRF 112 that the unicast bearer has been established and optionally information identifying the pre-allocated bearers, wherein the LTE PCRF 112 forwards this "bearer establishment" information regarding unicast bearer establishment and identification, if provided, to the CAD server AF 130 in an "enhanced" Rx AAA response message 224.

In an embodiment, the messages 222 and 224 (initiated by the generation and sending of 222) both include bearer establishment information of a list of one or more cell identifiers corresponding to one or more cells in which a unicast bearer was established for the UE along the UE's route to the incident and/or at the incident location; which is novel over the known Rx AAA and Gx RAA messages, which makes these messages "enhanced". In another embodiment (particularly where the CAD provided a list of cell identifiers where a bearer is requested), the Rx AAA response 224 could provide a list of cell identifiers corresponding to cells/sectors in which a bearer was not established. From this information, the system element determines the cells/sectors in which the bearer was established. Moreover, in a further embodiment, the Rx AAA response 224 could include any type of information that indicates status of the bearer establishment request or whether a bearer was established including, but not limited to, that a bearer was not established.

Another feature of the teachings herein is that the Rx and Gx request messages 216 and 218 can include a time indication or indicates a time window on a per cell basis that specifies at what point in the future to establish the bearer. This is useful if the responder is a significant distance from the incident scene, so as not to unnecessarily tie up resources in the RAN. For such an embodiment, the CAD could determine the responder UE's distance to certain cells based on its knowledge of the UE's location, calculate an estimated time to reach the cells, and provide this calculation in the bearer request as a time indication or time window as to when certain bearers should actually be reserved, or an absolute time could be provided such as start bearer at 11 am. It should be further noted that the time window could be adjusted as conditions change. Moreover, the CAD server 108 can be further configured to de-allocate bearer resources when it becomes aware that they are no longer needed, e.g., due to a change in route for a responder, due to a responder being called-off from responding to the incident, for cells responders already have left on the way to the incident scene, etc. Accordingly, the CAD server would provide a parameter (e.g., a time-based parameter such as a time window or absolute time, a location-based parameter such as the UE has left a cell, or other suitable parameter) to the EPC to process and effectuate such bearer de-allocation.

As stated above, the functionality according to the teachings herein can be implementing in any suitable system element having an application function (such as a CAD server or any other server, or a UE) but is advantageously implemented in the CAD server (which was previously non-LTE aware) to obtain bearers for and on behalf of the applications in the UEs assigned to an incident. This is because the CAD server has global visibility to information about all responders dispatched by the CAD server to an incident and their locations and status information and can, therefore, better manage the bearer pre-allocation mechanism. Also, since the CAD server has visibility of the incident from start to finish, the CAD server has an advantageous vantage point for making any needed adjustments to resource allocations as the incident progresses.

Figure 3:
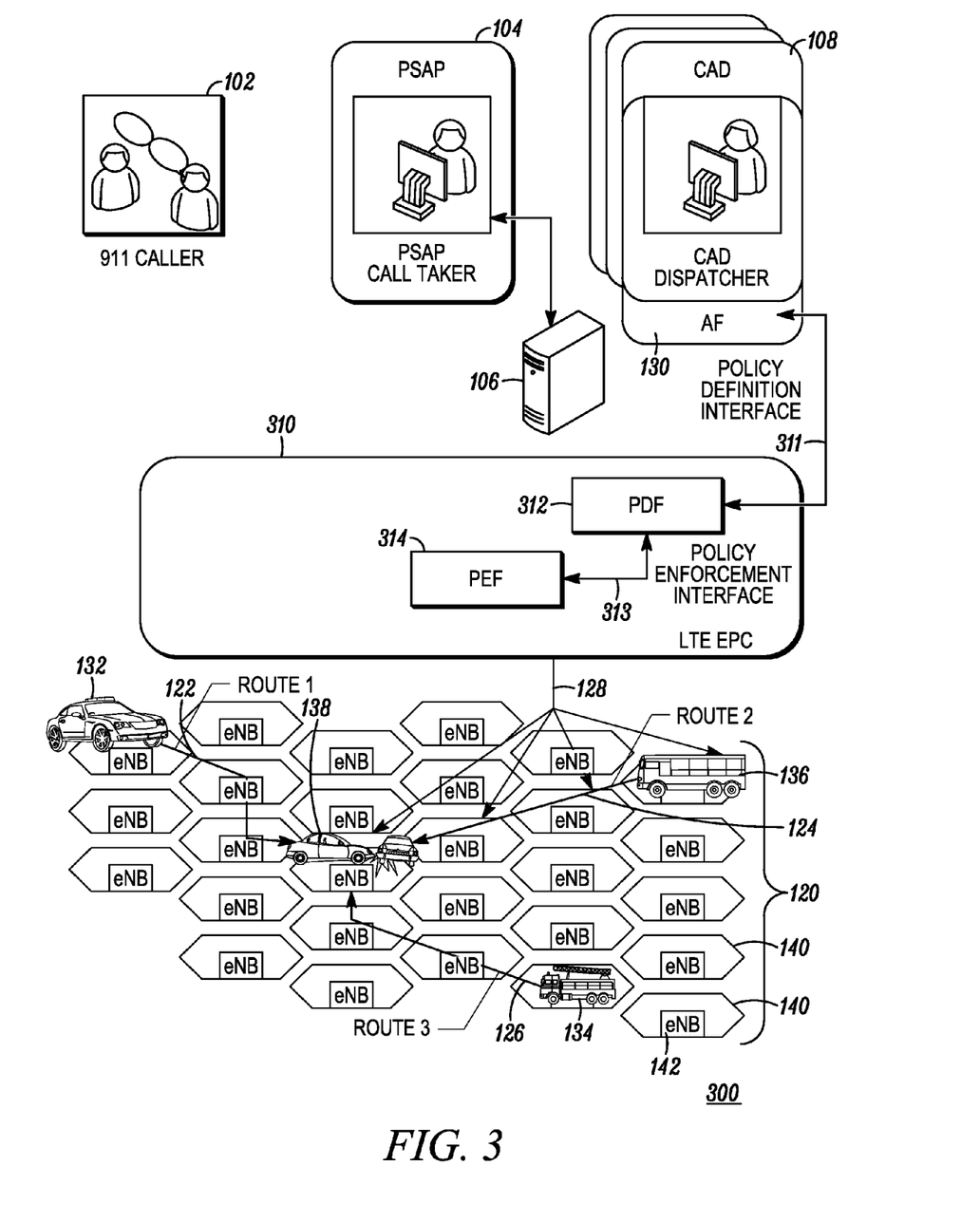
FIG. 3 is a diagram of a communication system that implements pre-allocation of radio access network resources for group communications in accordance with some embodiments.

The teachings herein can also be used to pre-allocate bearers for group communications in the RAN 120, e.g., multicast bearers, broadcast bearers, etc. FIG. 3 illustrates a system 300 for allocating bearers for group communications in accordance with an embodiment. Most elements of system 300 are identical to those included in the system 100 of FIG. 1, the description of which will not be repeated here for the sake of brevity. However, a difference between systems 100 and 300 is the LTE EPC. LTE EPC 310 is shown as including a PDF 312 coupled to the system element (in this case the CAD AF 130) over a policy definition interface 311, and a PEF 314 coupled to the PDF 312 over a policy enforcement interface 313.

The PDF 312 (like the PDF 112) is a logical element that provides for, identifies, stores, or otherwise obtains operator-defined rules for resource allocation and usage; and the functionality of the PDF can be placed in any suitable logical element of the EPC. The 3GPP TS documents have not, as of yet, identified an element that performs the function of the PDF or an associated interface 311. However, the PDF functionality could be incorporated into current EPC elements including the PCRF, a BM-SC (Broadcast Multicast Service Center), MBMS-GW (Multimedia Broadcast/Multicast Gateway), or in a new LTE element.

The PEF 312 (like the PEF 114) is a logical element that applies or enforces the operator-defined rules for resource allocation and usage; and the functionality of the PEF can be placed in any suitable logical element of the EPC or in some instance in the RAN. The 3GPP TS documents have not, as of yet, identified an element that performs the function of the PEF or an associated interface 313. However, the PEF functionality could be incorporated into current EPC elements including the BM-SC, the MBMS-GW, in a new LTE element, or in one or more eNodeBs.

FIG. 4 illustrates a signaling diagram 400 for pre-allocating a bearer for group communications. Signaling diagram 400 illustrates the messaging (and related illustrated functionality) by and between the calling device of the 911 callers 102, an AN 402, the PSAP 104, the CAD server 108, the PDF 312, the PEF 314 and one or more eNB 142. The format of messages exchanged between the calling device of the 911 callers 102, the AN 302, the PSAP 104 and the CAD server 108 depend on the particular network and, where applicable, the air interface and modulation schemes implemented in the system elements or any internal interfaces within the devices. The format of messages exchanged between the CAD 108, the PDF 312, the PEF 314, and one or more eNB 142 are in accordance with 3GPP TS for LTE both current and any future revisions; however, the content of some of these messages is adapted for the teachings herein as described later in further detail.

In this embodiment, the calling device of a 911 caller 102 initiates a new call 404 to report an incident. The AN 402 provides location information 406 to the PSAP 104, and the 911 callers 102 provide an incident description 408 to the PSAP 104, which the PSAP 104 uses to assign 410 one or more agencies to the incident. The CAD server 108 performs a dispatch calculation 414 based on received information 412 from the PSAP 104 and determines from its dispatch calculation that one or more groups (e.g., multicast groups, broadcast groups, etc.) can be established to more efficiently distribute data between the responders dispatched to the scene. Therefore one or more bearers for group communications are requested 416, 418 and responses 428, 430 (which is initiated by the generating and sending of message 428) are provided indicating that a bearer for group communication was established for one or more groups of responders. The signaling and functionality 404, 406, 408, 410, 412, 414, 416, 418, 428, and 430 are virtually the same as the respectively corresponding signaling and functionality 204, 206, 208, 210, 212, 214, 216, 218, 222, and 224; the detailed description of which will not be repeated in detail here for the sake of brevity.

Further to the signaling diagram 400, upon the PEF 314 receiving the message 418, which included the request for the bearer for group communications, the LTC EPC 310 processes the request to pre-allocate the bearer. This processing includes signaling (420, 426) between the PEF 314 and the eNB 142 to establish a group session and to reserve the bearer for the group session prior to the arrival in the cells of one or more of the group members, wherein this signaling is as described in the 3GPP TS 23.246 and 26.346 for LTE. The signaling to establish the session may include, in one embodiment, one or more of a list of cell identifiers (e.g., infrastructure identifiers, sector identifiers, etc.), mapping coordinates, location coordinates, area or location identification, or a route indication to identify cells for which the multicast bearer is needed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for establishing a dedicated bearer described herein. The non-processor circuits may include, but are not limited to, a radio receiver, a radio transmitter, signal drivers, clock circuits, power source circuits, and user input devices. As such, these functions may be interpreted as steps of a method to perform the establishing of a dedicated bearer described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bearer establishment in a radio access network (120), the method comprising:
   at a system element (108) having an application function:
   determining pre-allocation information used to select at least one cell (140) in the radio access network to which a set of user equipment (132, 134, 136) will connect for exchanging data;
   sending, to an evolved packet core (110), a request (216) to establish a bearer (220) for at least one user equipment in the set, wherein the request includes the pre-allocation information, wherein the determining and the sending are performed prior to the at least one user equipment in the set coming within a geographic serving area of the at least one cell identified by the pre-allocation information; and
   receiving a response (224) from the evolved packet core (110) indicating that the bearer was established in the at least one cell;
   wherein: the request to establish the bearer comprises a first message sent on a policy definition interface (111) between the system element and a Policy Definition Function (112); and
   the first message initiates generation of a second message sent on a policy enforcement interface (113) between the Policy Definition Function and a Policy Enforcement Function (114), wherein the second message includes the pre-allocation information or a translation of the pre-allocation information.

2. The method of claim 1 wherein:
the pre-allocation information comprises a location of an incident to which the set of user equipment have been dispatched; and
the response indicates that the bearer was established at a cell providing coverage at the location of the incident.

3. The method of claim 1 wherein:
the pre-allocation information comprises a route to a location of an incident to which the set of user equipment have been dispatched; and
wherein the response indicates that the bearer was established at a cell providing coverage along the route to the location of the incident.

4. The method of claim 1, wherein the pre-allocation information comprise at least one of a list of cell identifiers, mapping coordinates, location coordinates, area or location identification, or a route indication for the set of user equipment.

5. The method of claim 1, wherein the translation of the pre-allocation information comprises at least one of a list of cell identifiers.

6. The method of claim 1, wherein:
the policy definition interface is an Rx interface between the system element and a Policy and Charging Rules Function, and the first message is an Rx AAR message; and the policy enforcement interface is a Gx interface between the Policy and Charging Rules Function and a Packet Data Network Gateway, and the second message is a Gx RAR message.

7. The method of claim 1 wherein:
a third message containing bearer establishment contents is generated and sent on the policy enforcement interface, and
responsive to the generation and sending of the third message, a fourth message containing the bearer establishment content is generated and sent on the policy definition interface, and wherein the response comprises the fourth message; and
wherein the method further comprises the system element determining, based on the bearer establishment contents contained in the fourth message, at least one of a list of cells or a list of sectors in which a unicast bearer was established.

8. The method of claim 7, wherein the contents of third message and contents of the fourth messages each includes at least one of a list of cell identifiers to enable the system element to determine the at least one of a list of cells or a list of sectors in which the unicast bearer was established.

9. The method of claim 7, wherein:
the policy definition interface is an Rx interface between the system element and a Policy and Charging Rules Function, and the third message is an Rx AAA message; and
the policy enforcement interface is a Gx interface between the Policy and Charging Rules Function and a Packet Data Network Gateway, and the fourth message is a Gx RAA message.

10. The method of claim 1, wherein the request to establish the bearer further indicates a time window during which to establish the bearer.

11. The method of claim 1 further comprising the system element providing to the evolved packet core a parameter that controls when to de-allocate the bearer that was established at the at least one cell.

12. The method of claim 1, wherein the request to establish the bearer comprises a request to establish a bearer for group communications, which initiates signaling between a Policy Enforcement Function in the evolved packet core and a set of eNodeBs to establish a group session and to pre-allocate the bearer for group communications prior to the at least one user equipment in the set of user equipment coming within the geographic area of the set of eNodeBs.

13. The method of claim 12, wherein the signaling comprises at least one of a list of cell identifiers, mapping coordinates, location coordinates, area or location identification, or a route indication.

14. A method for bearer establishment in a radio access network (120), the method comprising:
at an evolved packet core (110):
receiving, from a system element (108) having an application function, a request (216) that includes pre-allocation information used to select a set of cells in the radio access network to which at least one user equipment in a set of user equipment will connect for exchanging data, wherein the request is for establishing a bearer (220), wherein the request is received prior to the at least one user equipment (132, 134, 136) in the set of user equipment coming within a geographic serving area of the set of cells;
processing the request to establish the bearer in the set of cells; and
providing, to the system element, a response (224) to the request, wherein the response indicates that the bearer was established;
wherein the request to establish the bearer comprises a request to establish a bearer for group communications, which initiates sianalina between a Policy Enforcement Function in the evolved packet core and a set of eNodeB to establish a group session and to pre-allocate the bearer for aroup communications prior to the at least one user equipment in the set of user equipment coming within the geographic area of the set of eNodeBs, wherein the signaling comprises at least one of a list of cell identifiers, mapping coordinates, location coordinates, an area or location identification, or a route indication for the set of user equipment.

15. The method of claim 14, wherein the request comprises an AAR message received by a Policy and Charging Rules Function on an Rx interface:
wherein processing the request to establish the bearer comprises the Policy and Charging Rules Function sending to a Packet Data Network Gateway a RAR message on a Gx interface, wherein the RAR message includes the pre-allocation information or a translation of the pre-allocation information and causes a unicast bearer to be established at the set of cells; and
wherein the response indicates that the unicast bearer was established.

16. The method of claim 15, wherein:
the response comprises an AAA message sent on the Rx interface between the system element and the Policy and Charging Rules Function;
generation of the AAA message is initiated by a RAA message that is generated and sent on the Gx interface between the Policy and Charging Rules Function and the Packet Data Network Gateway, wherein contents of the AAA message enable the system element to determine at least one of a list of cells or a list of sectors in which the unicast bearer was established.

17. The method of claim 14, wherein the pre-allocation information comprises at least one of a list of cell identifiers, mapping coordinates, location coordinates, area or location identification, or a route indication for the set of user equipment.

18. An apparatus for bearer establishment in a radio access network comprising:
an application server that is configured to:
determine pre-allocation information used to select at least one cell in the radio access network to which a set of user equipment will connect for exchanging data;
send, to an evolved packet core, a request to establish a bearer for at least one user equipment in the set, wherein the request includes the pre-allocation information, wherein the determining and the sending are performed prior to the at least one user equipment in the set coming within a geographic serving area of the at least one cell identified by the pre-allocation information; and
receive a response from the evolved packet core indicating that the bearer was established in the at least one cell;
wherein: the request to establish the bearer comprises a first message sent on a policy definition interface between the system element and a Policy Definition Function; and
the first message initiates generation of a second message sent on a policy enforcement interface between the Policy Definition Function and a Policy Enforcement Function, wherein the second message includes the pre-allocation information or a translation of the pre-allocation information.

* * * * *